(12) United States Patent
Friedlaender et al.

(10) Patent No.: US 7,973,092 B2
(45) Date of Patent: Jul. 5, 2011

(54) PET BOTTLE RECYCLING

(75) Inventors: Thomas Friedlaender, Regensburg (DE); Maren Hofferbert, Regensburg (DE); Timm Kirchhoff, Langballig (DE)

(73) Assignee: Krones AG, Neutraubling (DE)

( * ) Notice: Subject to any disclaimer, the term of this patent is extended or adjusted under 35 U.S.C. 154(b) by 212 days.

(21) Appl. No.: 10/575,313

(22) PCT Filed: Oct. 9, 2004

(86) PCT No.: PCT/EP2004/011319
§ 371 (c)(1),
(2), (4) Date: Sep. 21, 2006

(87) PCT Pub. No.: WO2005/037514
PCT Pub. Date: Apr. 28, 2005

(65) Prior Publication Data
US 2007/0123596 A1 May 31, 2007

(30) Foreign Application Priority Data
Oct. 13, 2003 (DE) .................................. 103 48 144

(51) Int. Cl.
*C08J 11/04* (2006.01)
(52) U.S. Cl. ............. 521/48; 521/40; 521/40.5; 521/45; 521/45.5; 528/480; 528/499; 528/502 R; 241/24.1; 241/24.15; 241/29; 241/38; 241/43
(58) Field of Classification Search .................... 521/48, 521/48.5, 40, 41, 40.5, 43.5, 44, 44.5, 45.5, 521/42, 42.5, 45, 46, 46.5, 47, 6, 48.54; 241/38, 241/24.1, 24.15, 29, 43; 528/480, 481, 491, 528/500, 501, 502 R, 502 E, 503, 499
See application file for complete search history.

(56) References Cited

U.S. PATENT DOCUMENTS

| 5,115,987 A | 5/1992 | Mithal |
| 5,255,859 A | 10/1993 | Peacock et al. |
| 5,688,693 A | 11/1997 | Fine et al. |
| 5,899,392 A | 5/1999 | Hayward et al. |

(Continued)

FOREIGN PATENT DOCUMENTS

CH 683674 4/1994

(Continued)

OTHER PUBLICATIONS http://www.wipo.int/pct/en/texts/pdf/ispe.pdf#page=76 p. 78, 10.14.*

*Primary Examiner* — James Seidleck
*Assistant Examiner* — Frances Tischler
(74) *Attorney, Agent, or Firm* — Marshall, Gerstein & Borun LLP

(57) ABSTRACT

A method for reprocessing used PET bottles having the steps of shredding the bottles to form plastic flakes, sorting the plastic flakes according to at least one criterion into at least two partial quantities, and performing an individual processing treatment including a decontamination treatment. The device permits performing the method whereby it is possible to separate the plastic flakes produced from the threaded part of a PET bottle, these flakes being more difficult to purify, from the lighter plastic flakes from the wall of the bottle, which have a thin wall and are easier to purify, and treating them further in separate reprocessing steps.

8 Claims, 3 Drawing Sheets

U.S. PATENT DOCUMENTS

| | | |
|---|---|---|
| 6,288,131 B1 * | 9/2001 | Erden et al. ............... 521/48 |
| 6,376,563 B2 * | 4/2002 | Robinson et al. ............ 521/48 |
| 2007/0123596 A1 | 5/2007 | Friedlaender et al. |

FOREIGN PATENT DOCUMENTS

| | | |
|---|---|---|
| DE | 3728558 A1 | 3/1989 |
| DE | 10002682 | 8/2001 |
| EP | 0492043 | 7/1992 |
| JP | 2003291144 | 10/2003 |
| RU | 2150385 | 6/2000 |
| WO | WO 93/23465 | 11/1993 |
| WO | WO 95/05249 | 2/1995 |
| WO | WO 00/46004 | 8/2000 |
| WO | WO 01/21373 A1 | 3/2001 |

* cited by examiner

PET BOTTLE RECYCLING

CROSS-REFERENCE TO RELATED APPLICATION

This is the U.S. national stage under 35 U.S.C. §371, of international application no. PCT/EP2004/011319, having an international filing date of Oct. 10, 2004, and claims priority to German application no. 10348144.3 filed on Oct. 13, 2003.

FIELD OF THE DISCLOSURE

The disclosure relates to a method and a device for reprocessing used PET bottles.

BACKGROUND OF THE DISCLOSURE

Methods and devices for reprocessing used PET bottles are known. In general, first the labels are released and removed. Then in another step, a mill is used to shred the bottles, including the caps, to form flakes. This product mixture is then washed in various washing steps and any glue residues are removed. Then the different types of plastic are separated (PET for the body of the bottle and polyethylene for the cap). In an optional subsequent decontamination step, the PET is then purified so that it can be reused to produce new bottles.

Examples of such reprocessing methods are described in U.S. Pat. No. 5,115,987 A, U.S. Pat. No. 5,688,693 A or German Patent 10 002 682 A1.

However, these known methods have the following disadvantage: in contrast with glass, where contaminants are deposited on the surface of the glass and can then easily be removed again, in the case of PET bottles, the contaminants diffuse into the material. Depending on how thick the walls of plastic are, the contaminants diffuse back out of the material at different rates in decontamination. To be sure that the shredded plastic material has in fact been completely purified, the reprocessing parameters must be adjusted so that even the most deeply contaminated components having thick walls must be adequately decontaminated. Therefore, in the state of the art, the cleaning and reprocessing parameters have been adapted to the thicker parts that are the most difficult to clean. However, this is economically feasible only to a limited extent because it involves "overcleaning" of the thinner plastic flakes.

SUMMARY OF THE DISCLOSURE

However, the object of the present disclosure is to propose a method and a device with which PET bottles can be reprocessed more economically.

According to the disclosed method, after shredding the bottles to yield plastic flakes, they are sorted into at least two partial quantities according to at least one criterion, and this is followed by an individual reprocessing treatment and/or utilization of each of the partial quantities.

The term plastic flakes is understood to refer to flakes that are essentially of a pure type, i.e., all the flakes originate from bottle material, i.e., other materials have been separated out prior to the shredding step or prior to the sorting step and are being recycled or disposed of in separate cycles. Other materials here include the labels and the plastic container caps such as polyethylene screw caps or aluminum screw caps. Thus in step b), essentially pure plastic flakes are sorted into at least two partial quantities and treated further according to at least one criterion.

In a preferred embodiment, the plastic flakes in step b can be sorted according to different sizes and/or different thicknesses and/or different weights and/or different densities. In a traditional PET bottle, a distinction is made essentially according to the plastic flakes, which originate from the wall of the bottle, and the plastic flakes which originate from the head of the bottle, i.e., the section having thicker PET. Since these two families of plastic flakes differ in the difficulty of cleaning them, the sorting criterion should also result in separation of these two types of plastic flakes. The two types differ essentially in their thickness and/or in their different weights and/or their different sizes, optionally also according to the degree of crystallization which in turn influences the density. It is thus advantageous to sort the plastic flakes according to one criterion or a combination of these criteria. The flakes of multilayer PET bottles can also be sorted accordingly because the flakes of the barrier layer are much thinner than the flakes of the inside wall and the outside wall.

The first partial quantity could advantageously consist of approximately 95%, in particular at least 98% plastic flakes from thick-walled parts of the beverage container, in particular the threaded part, and the second partial quantity consists of at least approximately 95%, especially at least 98% plastic flakes from thin-walled parts of the beverage container. A 100% separation of the two types of plastic flakes is theoretically possible but is not very reasonable economically because it is time-consuming and therefore expensive. It has been found that it is sufficient to perform the sorting with approx. 95% certainty in order to meet the required safety standards. In other words, max. 5% of the sorted plastic flakes will consist of the other type of plastic flake. Such a separation quality can be achieved in a technically and economically reasonable manner, as explained further below, so the method is more efficient and less expensive on the whole. Depending on the partial quantity, the plastic flakes can advantageously be treated at a different temperature in process step (c). It is known that the diffusion process takes place more rapidly at higher temperatures and more slowly at lower temperatures. Therefore, the decontamination process can be optimized via the temperature as a function of the size and/or thickness of the plastic flakes.

In an especially advantageous embodiment, the first partial quantity can be treated at a higher temperature than the second partial quantity. For example, the decontamination temperatures for the two partial quantities may be set so that the duration of the decontamination step is essentially the same for the two partial quantities. Therefore, the total reprocessing time for the two partial quantities can be adjusted, which has a positive effect on the utilization of a reprocessing plant because the decontamination part of a reprocessing plant is used for equal lengths of time for both partial quantities.

Alternatively or additionally, the plastic flakes may be treated for different periods of time, depending on the partial quantity in the process step (c). Since diffusion depends not only on temperature but also on time, these parameters can be varied to optimize the reprocessing operation. The one (first) partial quantity may be treated for a longer period of time than the second partial quantity. The thicker plastic flakes are in the first partial quantity, so this makes it possible to achieve the result that both partial quantities are decontaminated essentially equally well. Thus the two partial quantities can be combined after reprocessing and may be processed jointly again to beverage bottles or the like. However, it is also possible to eliminate any decontamination of the one (first) partial quantity if it is intended for use in the non-food area, for example. In this case, the plastic may be extruded and granulated immediately. Direct disposal of the one partial quantity is also conceivable.

In a preferred embodiment, the first partial quantity can be shredded subsequently in another shredding step in process step (c). This yields plastic flakes of similar thicknesses as in the second partial quantity, which thus means that the first partial quantity can be treated like the second partial quantity in decontamination in process step (c) without having to heat the plastic flakes of the first partial quantity to an excessive extent or having to decontaminate them for an excessively long period of time.

The first partial quantity and the second partial quantity may also be recombined after the subsequent shredding step of the first partial quantity and the decontamination may be performed jointly in process step (c). The subsequent shredding may be performed in such a way that the thickness and/or size and weight of the plastic flakes correspond to those of the plastic flakes of the first partial quantity; therefore, decontamination can be performed in a joint decontamination step.

In a particularly advantageous manner, a pneumatic table may be used in the sorting step (b). Pneumatic tables are especially suitable for sorting the plastic flakes because they are capable of sorting mixtures of material having the same density according to size and/or thickness and/or weight. Sorting of plastic flakes can thus be performed reliably and reproducibly.

The device for performing the method includes at least one shredding unit for shredding the plastic containers to yield plastic flakes, a sorting system for sorting the plastic flakes according to at least one criterion in at least two partial steps and a decontamination unit for decontaminating the plastic flakes.

In a preferred embodiment, the sorting system may include a pneumatic table. Pneumatic tables can separate material mixtures of the same density into two partial quantities according to difference in thickness and/or difference in size and/or difference in weight.

The sorting section may advantageously also include a screening section. Pneumatic tables operate better with a limited particle size spectrum. It is therefore more advantageous to have this mixture pass through a screen that removes small fractions before the material mixture enters the pneumatic table. The oversize particles are then charged to the pneumatic table. This further improves the quality of the separation.

BRIEF DESCRIPTION OF THE DRAWINGS

Exemplary embodiments of the present invention are depicted in the drawings and explained in greater detail below. They show.

DETAILED DESCRIPTION OF THE DISCLOSURE

Figure 1:
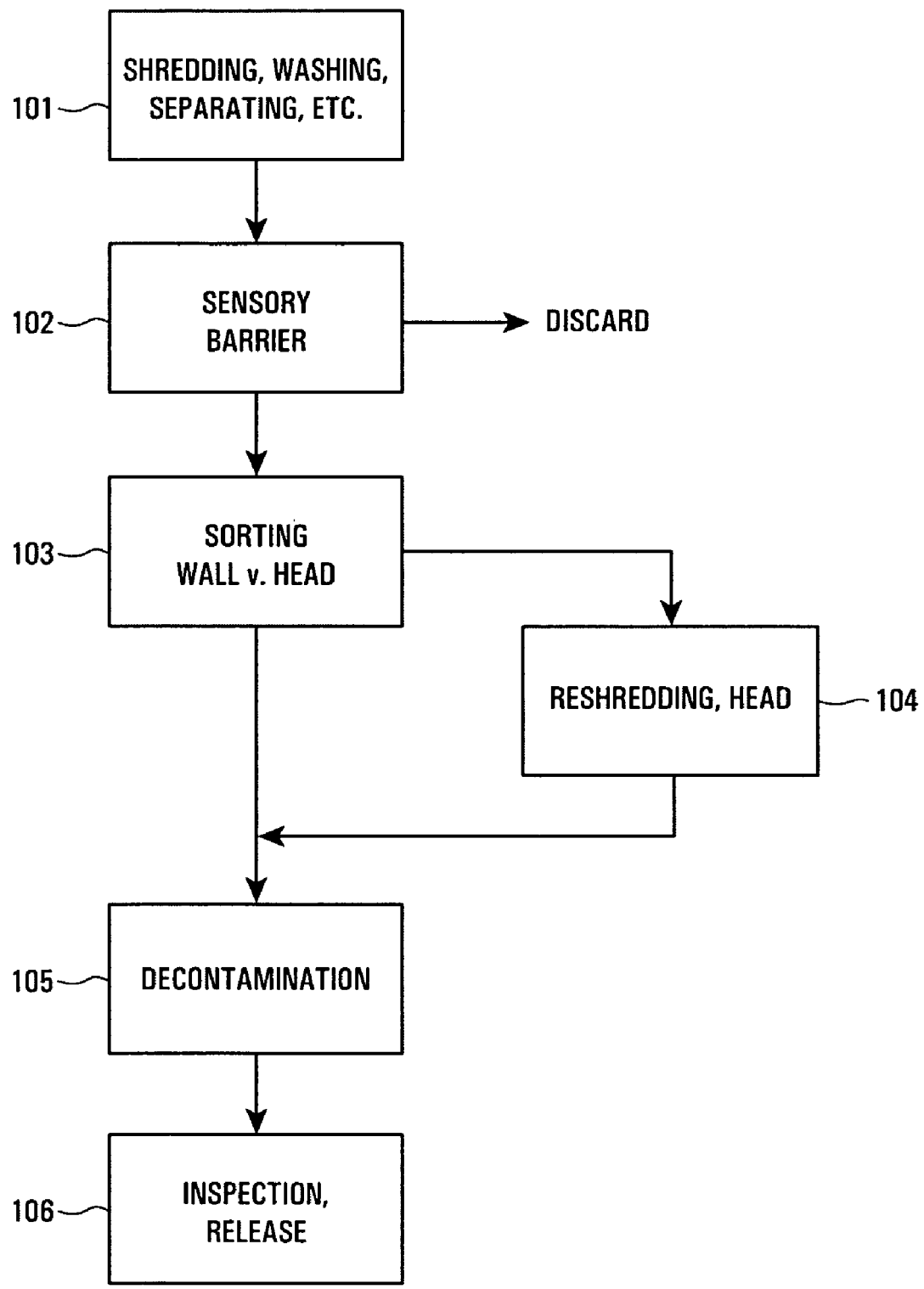
FIG. 1 a block diagram of a first exemplary embodiment of the disclosed method for reprocessing used plastic containers, in particular PET bottles.

The block diagram according to FIG. 1 shows the individual process steps represented symbolically. The PET bottles are first shredded and washed in a known manner in step 101. This is also where there is a separation into PET components and other components, i.e., caps, labels, glue residues or any bottom caps that may be present are removed. At the end of process step 101, essentially one has only pure PET flakes.

The PET flakes are then sent past a sensory barrier 102 where very highly contaminated flakes are sorted out and discarded.

The PET plastic flakes, which is all that remains at that point in time, are sorted in process step 103. The sorting may take place in such a way that the first partial quantity is formed essentially by parts and/or flakes having thicker walls, i.e., in particular those flakes originating from the thread and/or the head of the bottle while the second partial quantity contains the parts having thinner walls. This separation may be performed with various auxiliary means. A so-called pneumatic table which is described in greater detail in conjunction with FIG. 3 seems especially suitable here.

In step 103, it is not absolutely necessary to achieve 100% separation of the flakes. A purity of 95%, especially 98% is sufficient.

In the process embodiment depicted in FIG. 1, an individual reprocessing treatment of the individual partial quantities is accomplished by the fact that the thicker PET flakes are subjected to a subsequent shredding in block 104. This subsequent shredding is preferably performed in such a way that the flake pieces obtained by this process can be decontaminated together with the thin flakes in a joint decontamination step which is tailored to the thin-walled plastic flakes. This step generally includes a washing operation and a drying operation. It has been found that with typical flake sizes of less than 10 mm diameter, for example, a drying time of four hours at approximately 170° C. is sufficient to remove approximately 99% of all impurities. These process steps may also be performed with local separation at the recycler's and/or converter's.

In the last step 106, the flakes are inspected again and if the purity is adequate, they are released for further processing. The inspection may be performed here by using a gas chromatograph, for example.

Figure 2:
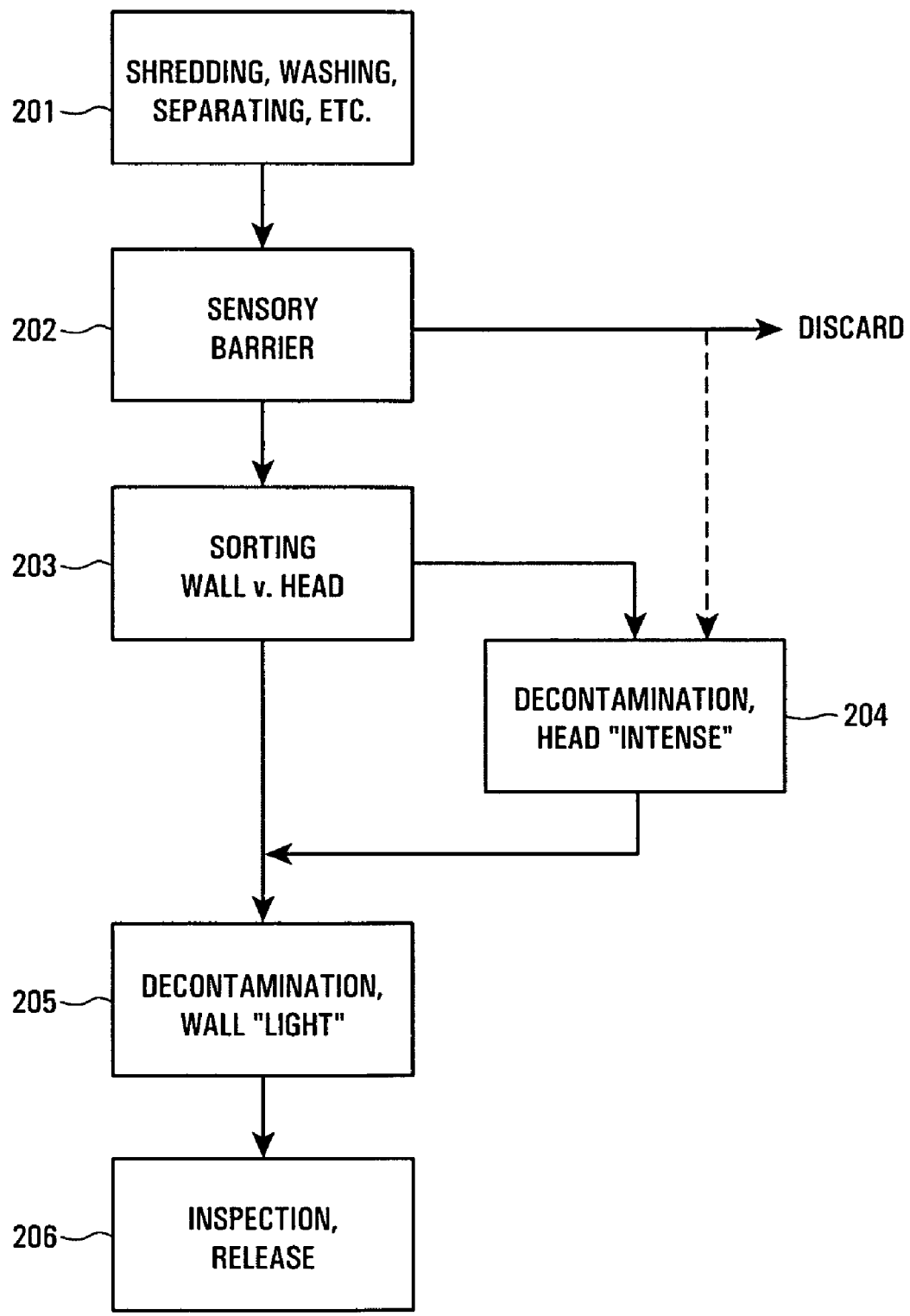
FIG. 2 a second exemplary embodiment of the disclosed method for reprocessing used plastic containers, especially PET bottles, FIG. 3 a schematic diagram of an exemplary embodiment of an disclosed device for reprocessing used plastic containers, especially PET bottles.

In the process variant depicted in FIG. 2, after shredding 201 and the sorting step 203 the larger flakes are not subjected to a subsequent shredding. Instead, a different decontamination 204, 205 is performed for the two partial quantities. The neck areas, i.e., the areas in which the resulting PET flakes are thicker, are decontaminated more intensely, while a less intense decontamination is sufficient for flakes from wall areas that are thinner.

After this step the usual inspection 206 and release are again performed.

Figure 3:
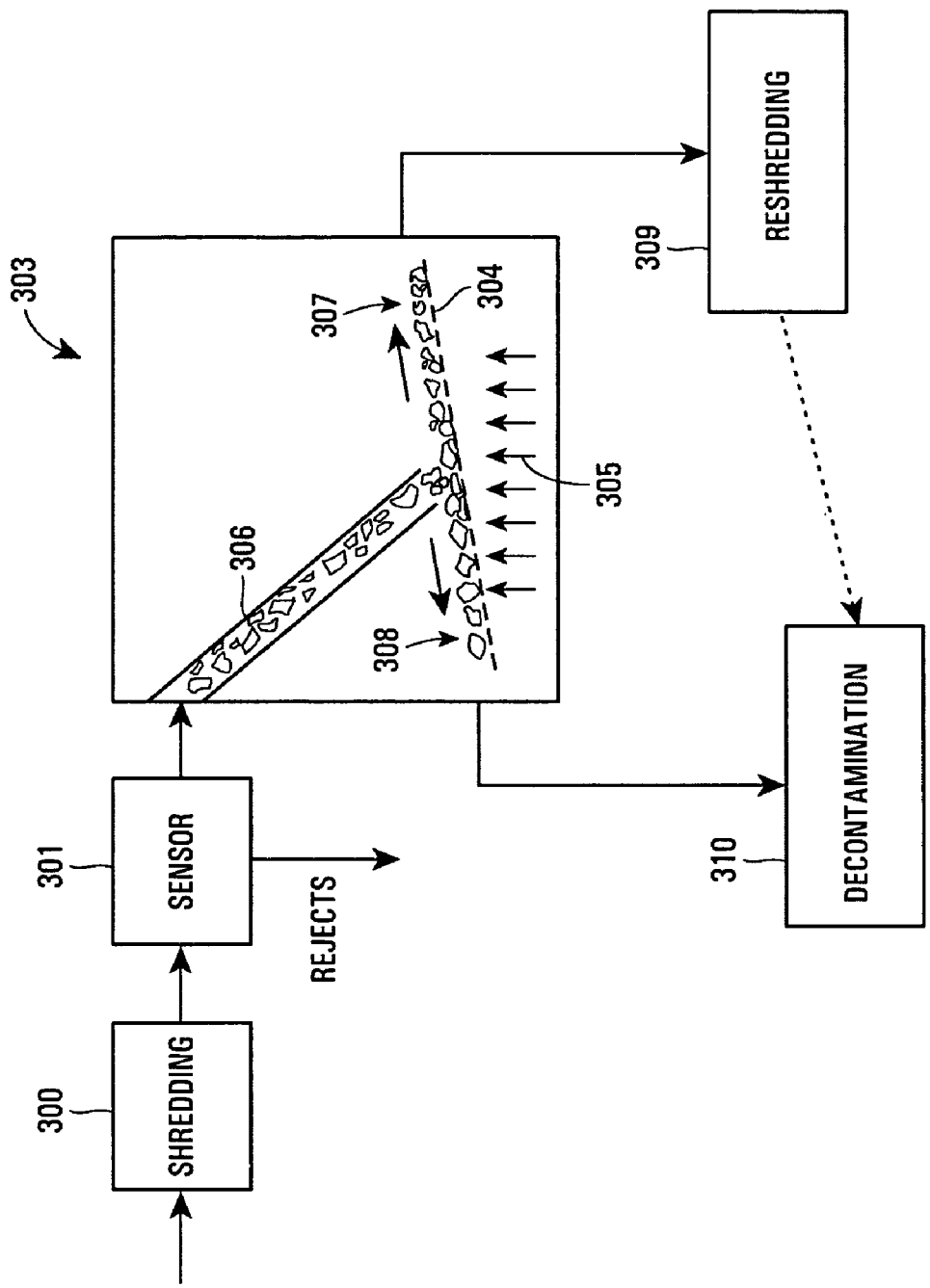

FIG. 3 shows schematically a plant for conducting the different process variants of the inventive process.

Such a plant includes a shredder 300 which shreds the PET bottles supplied to it. The shredded bottles then pass by a sensor 301 that sorts out highly contaminated parts.

A pneumatic table labeled as 303 is at the heart of the sorting system used in this embodiment to perform the process step (sorting out pure PET flakes).

Pneumatic table 303 has a perforated plate 304 which is inclined in the longitudinal direction and vibrates in this direction with a conveyor tendency directed upward, with air 305 flowing through it from beneath. The PET flakes 306 to be separated are charged onto the perforated plate 304 from above approximately at the center. The air flowing through the flakes fluidizes them and separates the charged flakes into heavy material that lies on the plate 304 and light material floating above that. The heavy material 307, namely thick PET flakes in this case, remains in contact with the plate 304 and is conveyed upward through the contact friction and the vibration of the plate. The lightweight material 308, i.e., the thin PET flakes move downward in the opposite direction. To improve the sorting results, the mixed material may additionally be presorted with the help of a screen before entering the pneumatic table 303 (not shown here). This may be advantageous if the pneumatic table operates better with limited particle size spectra. For example, a screen that removes a partial fraction with sizes smaller than 3 mm from the mixed material to later supply this fraction back to the partial quantity with the thin PET flakes may be connected upstream.

The partial quantity with the thicker PET flakes may then be reshredded once again, which is done in shredder 309, and then decontaminated together with the thinner PET flakes in a joint decontamination step 310, as indicated with the dotted arrow or in a version of the process that is not depicted here, the larger flakes may be supplied to a separate decontamination step without having to be reshredded.

In one experiment, PET flakes produced by milling new bottles were used as the starting material. The particle fraction smaller than 3 mm was removed with a screen. The remainder was then charged to a pneumatic table and operated at a throughput of 280 g/h, a perforation area of 600× 1200 mm with openings of 1.5 mm and a vibration frequency of 65 Hz. The inclination was adjusted so that round flakes could not roll down regardless of their size. Using these parameters, a fraction purity of more than 99% was obtained using the wall thickness as a separation criterion. The small fraction has a wall thickness of less than one millimeter, while the coarse fraction has wall thickness of more than one millimeter.

The invention claimed is:

1. Method for reprocessing used PET bottles, the method comprising:
   a) shredding the bottles to yield PET plastic flakes,
   b) sorting the PET plastic flakes according to at least one criterion into at least two partial quantities, and
   c) performing an individual reprocessing treatment of each of the at least two partial quantities, the individual reprocessing treatment including at least one decontamination treatment for each of the at least two partial quantities, wherein the PET plastic flakes are sorted in such a way that a first partial quantity consists of at least approximately 95% PET plastic flakes of thick-walled parts of the beverage container, and a second partial quantity consists of at least approximately 95% PET plastic flakes of thin-walled parts of the beverage container.

2. Method according to claim 1, wherein sorting the PET plastic flakes according to at least one criterion includes sorting the PET plastic flakes according to one of a difference in size, a difference in thickness, a difference in weight, a difference in density, a difference in crystallinity, and a combination of one or more thereof.

3. Method according to claim 1, wherein performing the individual reprocessing treatment further includes reshredding the first partial quantity.

4. Method according to claim 3, further comprising combining again the first partial quantity and the second partial quantity after reshredding the first partial quantity, and then jointly decontaminating the combined quantities.

5. Method according to claim 1, wherein sorting the PET plastic flakes according to at least one criterion includes using a pneumatic table.

6. Method according to claim 1, wherein sorting the PET plastic flakes according to at least one criterion includes a density separation as a function of crystallinity in a liquid medium.

7. Method according to claim 1, wherein the first partial quantity consists of at least approximately 98% PET plastic flakes of thick-walled parts of the beverage container.

8. Method according to claim 1, wherein the second partial quantity consists of at least approximately 98% PET plastic flakes of thin-walled parts of the beverage container.

* * * * *